United States Patent [19]

Bressan

[11] Patent Number: 5,251,497
[45] Date of Patent: Oct. 12, 1993

[54] TEST DEVICE FOR EQUIPMENT IN MOTION

[75] Inventor: Elie Bressan, L'Union, France

[73] Assignee: Alcatel Espace, Courbevoie, France

[21] Appl. No.: 786,839

[22] Filed: Nov. 1, 1991

[30] Foreign Application Priority Data

Nov. 6, 1990 [FR] France .................................. 90 13729

[51] Int. Cl.⁵ ............................................. G01N 17/00
[52] U.S. Cl. .................................................. 73/865.6
[58] Field of Search ................... 73/865.6, 117.1, 1 G

[56] References Cited

U.S. PATENT DOCUMENTS

| | | | |
|---|---|---|---|
| H229 | 3/1987 | Phillips .............................. | 73/865.6 |
| 3,044,301 | 7/1962 | Bennett ............................. | 73/117.1 |
| 3,063,291 | 11/1962 | Childs et al. ..................... | 73/117.1 |
| 3,714,833 | 2/1973 | Newman ............................. | 73/865.6 |
| 4,730,797 | 3/1988 | Minovitch ......................... | 244/159 |
| 4,860,600 | 8/1989 | Schumacher ...................... | 73/865.6 |
| 4,911,027 | 3/1990 | White ................................ | 73/865.6 |
| 5,062,771 | 11/1991 | Satov et al. ..................... | 417/45 |

FOREIGN PATENT DOCUMENTS

| | | | |
|---|---|---|---|
| 0001948 | 1/1988 | Japan ................................. | 73/865.6 |
| 0264273 | 2/1970 | U.S.S.R. ........................... | 73/865.6 |
| 1406572 | 6/1988 | U.S.S.R. ........................... | 73/865.6 |

*Primary Examiner*—Hezron E. Williams
*Assistant Examiner*—George Dombroske
*Attorney, Agent, or Firm*—Sughrue, Mion, Zinn, Macpeak & Seas

[57] ABSTRACT

A test apparatus for testing equipment in motion comprises a test device (1) for testing a piece of equipment (2) and a mobile enclosure (3) containing a gas lighter than air and surrounding the test equipment (2) located on the test device (1).

14 Claims, 1 Drawing Sheet

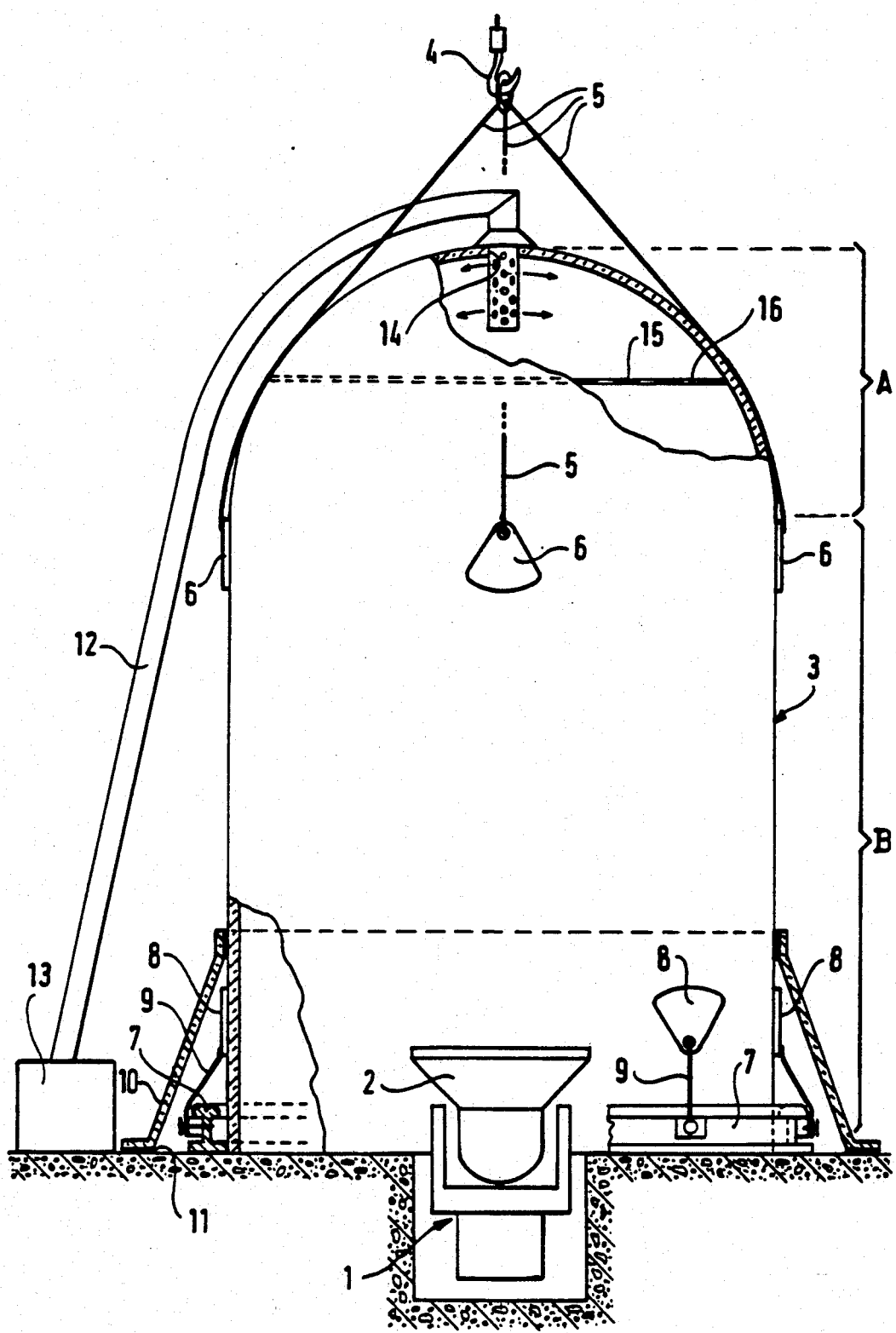

TEST DEVICE FOR EQUIPMENT IN MOTION

The present invention relates to a test device for testing equipment in motion, adapted in particular to test space equipment.

BACKGROUND OF THE INVENTION

Equipment used in space applications, for example solar panels, antenna reflectors, solar sails, etc. as well as the satellites themselves have to be subjected to various simulated conditions for testing their suitability in various mechanical environments and in order to determine with certainty their physical characteristics. In particular, such pieces of equipment are subjected to sinusoidal or random vibrations. Their moments of inertia, centers of gravity and dynamic balancing are all determined with the aid of tests in motion.

Hitherto these tests have been effected either under vacuum or, in the great majority of cases, under ambient conditions.

Working under vacuum imposes conditions somewhat similar to those affecting the satellite and its various pieces of equipment in space. The test is carried out under a vacuum bell in which the test means and the equipment to be tested have been placed. Electric motors for moving the equipment have to be lubricated regularly. Under vacuum the lubricant vaporizes and it is thus not effective. This difficulty accordingly leads to the use of special and accordingly very costly apparatus for tests under vacuum. Furthermore sealed connections have to be made between the measuring gauges, located inside the bell, and the recording apparatus, located outside the bell. Finally the use of a rigid structure like the vacuum bell involves very high expense. To carry out tests under vacuum is thus complex, inflexible and costly.

This is why the majority of simulations are made under ambient conditions. Ambient conditions (in air at atmospheric pressure) are clearly different from conditions genuinely close to the vacuum of space. In particular the resistance of the ambient medium on the moving surfaces of the test equipment is very great and increases with the area of the equipment and with the square of the speed of movement to which it is subjected. Since this aerodynamic resistance is very difficult to model mathematically because of the complexity of the surfaces of the test equipment, it is not possible to correct the results of tests in such a manner that it no longer needs to be taken into account. In particular, determination of the moment of inertia or the center of gravity of a structure with a large surface area is effected by measuring characteristic parameters under an oscillatory movement which is very much perturbed by the aerodynamic resistance. This implies an error in the value of the moment of inertia or in the position of the center of gravity, involving an error during the dynamic balancing of the equipment and accordingly during the dynamic balancing of the satellite itself.

Furthermore the momentum needed to displace a certain volume of gas is directly proportional to the density of this volume of gas. For this reason, for given motor power, the greater the density of the ambient medium, the smaller the momentum obtained relative to the momentum needed. It is then not possible to obtain the desired movements.

Finally, during vibration tests, for example, with a view to determining the characteristic modal masses and frequencies of the structure, the density of the ambient medium involves modifications in the values of these modal masses and frequencies in the ratio of calculated values. In particular, the modal masses in ambient air are higher than in a vacuum. which leads to additional stresses on the tested equipment (since it has been dimensioned to operate under a vacuum), which can lead to the structure breaking.

SUMMARY OF THE INVENTION

The object of the present invention is to provide a test device for equipment in motion, in a gas lighter than air, allowing the problems with ambient air to be overcome, while being less costly than an installation under vacuum.

To this end the present invention provides a test device for equipment in motion, comprising test means for testing the equipment, characterized in that the device comprises a mobile enclosure containing a gas lighter than air, said enclosure surrounding said test equipment located on said test means.

Such a device allows the adverse effects of aerodynamic resistance to be reduced, nevertheless at a markedly reduced cost and with much greater flexibility than devices allowing simulations to be carried out under vacuum.

According to an important characteristic of this device, the enclosure, which is hemispherical in its upper part and cylindrical in its lower part, is made from a material which is flexible and gas-tight to the gas lighter than air which it contains. This material may advantageously be translucent.

Accordingly it is possible to observe the test which is proceeding inside the enclosure. By using a flexible material, the enclosure can be folded up like a tent, thus reducing its bulk.

Helium may, for example, be used in a device according to the invention. The enclosure is then made of three-ply polyethylene for example.

According to another characteristic of the device of the invention, the upper part of the enclosure may be connected to external mechanical means allowing it to be raised, moved and lowered. The connection between the enclosure and the external mechanical means may be effected by straps fixed to the enclosure through patch pieces. The mechanical means is a hoist for example.

It is however possible to dispense with the external means for manipulating the enclosure. Thus it lifts of its own accord when it is full of helium and is then easy to manoeuver.

Furthermore the enclosure may be held on the ground by a retaining ring surrounding its lower part. It is also possible to fit a sealing jacket also surrounding the lower part of the enclosure and fixed both to the enclosure and to the ground in such a manner as to ensure complete sealing of the assembly.

The gas is advantageously introduced under pressure into the enclosure through an opening formed in the upper part of the enclosure. In order to ensure uniform volume distribution of the gas in the enclosure, a horizontal membrane impervious to the gas lighter than air and pierced regularly with holes is located in the upper part of the enclosure.

Finally the device according to the invention may be adapted to test moving space equipment.

Other features and advantages of the present invention appear from the following description, given by way of non-limiting example, of an embodiment of the device according to the invention and an example of the results obtained with this device.

BRIEF DESCRIPTION OF THE DRAWING

The sole FIGURE is a partially cut-away elevation of a preferred embodiment of the device according to the invention.

DETAILED DESCRIPTION OF THE PREFERRED EMBODIMENT

The device in accordance with the invention comprises test means 1, a piece of equipment to be tested 2, for example space equipment, and an enclosure 3.

The enclosure 3, whose upper part A is hemispherical (a dome) and whose lower part B is cylindrical, is made from three-ply polyethylene for example (being formed from three layers of polyethylene using techniques presently employed in the art of dirigibles). It is suspended from a hoist 4 enabling it to be raised, moved and lowered over the means 1 and the equipment 2, so that it surrounds the assembly 1, 2. The hoist serves also to hold it more securely in position, so that it does not damage the test equipment 2 or the test means 1. This holding up is effected by means of several straps 5, each having a first end connected to the hoist 4, and its other end connected to a respective patch piece 6, of fiber glass for example, fixed to the enclosure 3 and serving as a reinforcement to absorb the stress due to the weight of the enclosure 3 and thus to avoid tearing.

When not in use the enclosure 3 is folded up like a tent, which avoids any problem with its bulk.

In operation it is lowered by the hoist 4 so as to surround the assembly 1, 2 and is held on the ground by means of a metal retaining ring 7 having the form of a rail. Several patch pieces 8, similar to the patch pieces 6, enable the enclosure 3 to be attached to the ring 7 by means of straps 9. Complete gas-tightness of the assembly is ensured by means of a sealing jacket 10, for example of a material identical to that of the enclosure 3, surrounding the enclosure 3 at ground level and fixed both to the ground by sealing compound 11 and to the enclosure 3 by welding.

During use of the device in accordance with the invention, the enclosure 3 is filled with helium in the following manner: the enclosure 3 is unfolded on the ground and helium under pressure is fed into the dome A through a pipe 12, for example of polyethylene, connected to a pressurized supply tank 13 and passing into the dome A through an opening 14 formed at the top of the dome A. Only the part of the enclosure 3 between the top and a diffuser 15, whose use is explained below, is filled with helium. Helium being lighter than air, the enclosure 3 rises (the lift of helium is equivalent to 1 kg/m$^3$) and it is then attached to the hoist 4 by means of the straps 5. It is moved by the hoist 4 over the test equipment 2 located on the test means 1 and then lowered to be secured to the ground in the manner explained above, so as to surround the assembly 1, 2 but without making the seal. Filling by the helium under pressure is then completed, the air being expelled to the outside because the seal has not yet been made. Good distribution of the helium in the enclosure 3 is ensured by the diffuser 15, formed from a horizontal membrane, which is fixed to the dome A, is helium-tight and is pierced regularly with holes 16.

A total seal is then effected by the means described above.

The device thus provided has the advantage of being mobile, easily dismounted and of not involving any modification of the test means already in existence, since it surrounds the same.

In an example of an embodiment for dynamic balancing of a model satellite reproducing the surface thereof exactly, the model to be balanced is mounted on a rotating table, the whole being inside a device such as that described above, filled with helium.

In tests in air, without using the device in accordance with the invention, the maximum speed of rotation is 25 revolutions per minute (rpm) at the maximum power of the motor. However the speed of rotation needed to carry out the test is 40 rpm. It is thus impossible to produce the necessary power with the motor employed.

In tests using the device of the invention, under a nonhomogeneous atmosphere of helium (5 to 6% at 1 m from the ground, 100% at the top of the enclosure), the speed of rotation which is attained is 50 rpm at half motor power. The useful power of the motor is thus quadrupled and the speed of rotation needed to effect dynamic balancing is achieved.

Clearly the invention is limited neither to the preferred embodiment nor to the example which has been described.

In particular the device according to the invention may be used to test any equipment in motion.

The enclosure 3 can be made of any flexible material which is gastight to seal in the gas introduced into the enclosure.

It does not matter which gas lighter than air is used to fill the enclosure.

Furthermore any means may be employed which enable the sealing ability of the enclosure to be enhanced and other than the use of three thicknesses of material.

It is likewise possible to move the enclosure 3 without using the hoist 4. Thus, when the enclosure 3 rises of its own accord after its upper part is filled with helium between the top and the diffuser 15, it is enough to hold the straps, by hand for example, to move it. It is then attached to the ground as explained above, then the hoist 4 is attached, this latter then being used solely as safety means preventing the enclosure from damaging the equipment.

Access for personnel, in the form of a double airlock for example, may advantageously be arranged in the enclosure to allow human intervention in the case of a fault in the running of the test.

Finally and in a very advantageous manner, it is possible, depending on the test to be carried out, either to allow helium to leak out downwards and provide a permanent flow of helium through the opening 14 (in the case of dynamic balancing for example) or to ensure a complete seal as described above (for example for determining the moment of inertia, which requires a still medium).

I claim:

1. A test device for testing equipment in motion, comprising:

testing means for testing equipment; and a mobile enclosure surrounding said equipment being tested by said testing means, characterized in that said enclosure contains a gas lighter than air and comprises a material which is flexible and is gastight to said gas lighter than air, said enclosure being inflatable.

2. A device according to claim 1, wherein said enclosure includes first and second portions and an opening formed in said first portion, said gas being introduced into said enclosure under pressure through said opening formed in said first portion of said enclosure.

3. A device according to claim 2, further comprising a horizontal membrane, impervious to said gas lighter than air and having holes, positioned in the first portion of said enclosure so as to ensure a uniform volume distribution of said gas introduced into said enclosure.

4. A device according to claim 3, further comprising moving means connected to said enclosure for moving said enclosure.

5. A device according to claim 4, further comprising straps for connecting said moving means to said enclosure, said straps being fixed to said enclosure by patch pieces.

6. A device according to claim 5, characterized in that said moving means comprises a hoist.

7. A device according to claim 6, further comprising means for retaining said enclosure on the ground, said retaining means comprising a retaining ring coupled to said second portion of said enclosure.

8. A device according to claim 7, further comprising a sealing jacket surrounding the second portion of said enclosure and being adapted to be fixed to said enclosure and to the ground so as to completely seal the mobile enclosure.

9. A device according to claim 8, characterized in that said enclosure comprises a translucent material.

10. A device according to claim 9, characterized in that said enclosure comprises three-ply polyethylene and in that said gas lighter than air comprises helium.

11. A device according to claim 10, characterized in that the first portion of said enclosure has a hemispherical shape and said second portion has a cylindrical shape.

12. A device according to claim 11, characterized in that said equipment for testing by said testing means comprises space equipment which is in motion.

13. A test device for testing equipment in motion, comprising:
means for testing said equipment;
a mobile enclosure containing a gas lighter than air, said enclosure surrounding said equipment in motion;
means for moving said enclosure; and
means for connecting said moving means to said enclosure, said connecting means comprising straps fixed to said enclosure by patch pieces.

14. A test device for testing equipment in motion, comprising:
means for testing said equipment;
a mobile enclosure containing a gas lighter than air and surrounding said equipment in motion, said enclosure including first and second portions; and
a membrane impervious to said gas lighter than air and having holes pierced regularly therein, said membrane being positioned in the first portion of said enclosure so as to ensure a uniform volume distribution of said gas introduced into said enclosure.

* * * * *